United States Patent [19]
Sezai

[11] Patent Number: 5,283,588
[45] Date of Patent: Feb. 1, 1994

[54] MONOPULSE TRACKING APPARATUS
[75] Inventor: Toshihiro Sezai, Tokyo, Japan
[73] Assignee: National Space Development Agency of Japan, Tokyo, Japan
[21] Appl. No.: 990,398
[22] Filed: Dec. 11, 1992
[30] Foreign Application Priority Data
  Dec. 17, 1991 [JP] Japan .................................. 3-352869
[51] Int. Cl.$^5$ ........................ G01S 5/02; G01S 13/00
[52] U.S. Cl. ..................................... 342/427; 342/153
[58] Field of Search ................. 342/427, 149, 152, 153

[56] References Cited
U.S. PATENT DOCUMENTS
  4,219,816  8/1980  Schenkel et al. .................... 342/153

Primary Examiner—Gregory C. Issing
Attorney, Agent, or Firm—Armstrong, Westerman, Hattori, McLeland & Naughton

[57] ABSTRACT

A monopulse tracking apparatus comprises first to fourth electromagnetic horns disposed symmetrically to each other in an azimuthal direction and elevation direction in a 2×2 matrix state, a first hybrid circuit for creating the sum signal and difference signal of the first and second electromagnetic horns, a second hybrid circuit for creating the sum signal and difference signal of the third and fourth electromagnetic horns, a third hybrid circuit supplied with the respective sum signals of the first and second hybrid circuits and for outputting the sum signal and difference signal thereof, a fourth hybrid circuit supplied with the respective difference signals of the first and second hybrid circuits and outputting the sum signal and difference signal thereof, and a fifth hybrid circuit for creating the sum signal and difference signal of the first and fourth electromagnetic horns or the second and third electromagnetic horns.

3 Claims, 3 Drawing Sheets

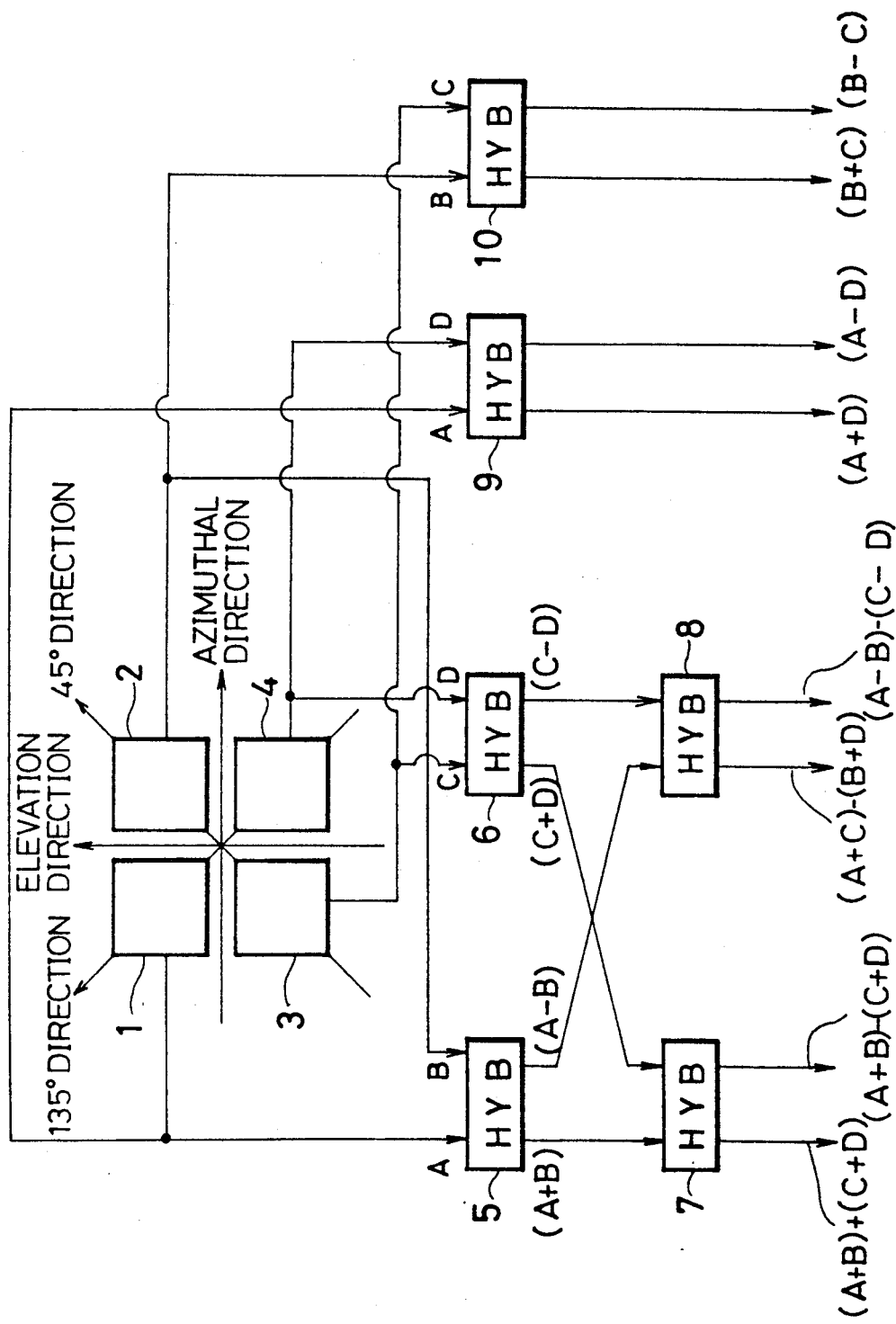

MONOPULSE TRACKING APPARATUS

BACKGROUND OF THE INVENTION

1. Field of the Invention

The present invention relates to an improved tracking apparatus employing a four-horn monopulse system.

2. Description of the Related Art

Conventionally, there is known a tracking apparatus employing a four-horn monopulse system as a means for finding a direction by making use of a radio wave. FIG. 1 schematically shows the structure of the tracking apparatus of the four-horn monopulse system, wherein 1, 2, 3 and 4 designate electromagnetic horns disposed symmetrically to each other in an azimuthal angle direction and elevation angle direction in a 2×2 matrix state. The electromagnetic horns 1 and 2 and electromagnetic horns 3 and 4 are disposed in the azimuthal angle direction, respectively; and the electromagnetic horns 1 and 3 and electromagnetic horns 2 and 4 are disposed in the elevation angle direction, respectively. Designated at 5, 6, 7 and 8 are hybrid circuit. The hybrid circuit 5 creates a sum signal (A+B) and difference signal (A−B) of the respective signals A and B received by the electromagnetic horns 1 and 2; and the hybrid circuit 6 creates a sum signal (C+D) and difference signal (C−D) of the respective signals C and D received by the electromagnetic horns 3 and 4. Further, the hybrid circuit 7 is supplied with the sum signal (A+B) created by the hybrid circuit 5 and the sum signal (C+D) created by the hybrid circuit 6 and creates a sum signal [(A+B)+(C+D)] thereof and a difference signal [(A+B)−(C+D)] thereof; whereas the hybrid circuit 8 is supplied with the difference signal (A−B) created by the hybrid circuit 5 and the difference signal (C−D) created by the hybrid circuit 6 and creates a sum signal [(A−B)+(C−D)=(A+C)−(B+D)] thereof and a difference signal [(A−B)−(C−D)] thereof.

According to the thus arranged 4-horn monopulse tracking apparatus, the difference signal [(A+B)−(C+D)] created by the hybrid circuit 7, i.e., the difference signal [(A+B)−(C+D)] obtained from the sum signal (A+B) of the electromagnetic horns 1 and 2 and the sum signal (C+D) of the electromagnetic horns 3 and 4 is used as an elevation angle error signal; and the sum signal [(A−B)+(C−D)=(A+C)−(B+D)] created by the hybrid circuit 8, i.e., the difference signal [(A+C) −(B+D)] obtained from the sum signal (A+C) of the electromagnetic horns 1 and 3 and the sum signal (B+D) of the electromagnetic horns 2 and 4 is used as a azimuthal angle error signal. Thus, the two-dimensional position of a radio wave emitting object can be determined by using these error signals. More specifically, although two or more kinds of information with respect to directions different to each other is generally needed to determine the two-dimensional position of an object, the aforesaid four-horn monopulse tracking apparatus can determined the two-dimensional position of the radio wave emitting object because it is provided with the two signals of the azimuthal angle error signal and elevation angle error signal.

Incidentally, since the conventional monopulse tracking apparatus is provided with only the two kinds of information as described above, when information cannot be obtained in one of the two systems for the azimuthal angle and elevation angle due to the failure of the apparatus, or the like, the tracking apparatus cannot determine a position. To prevent the occurrence of such a situation, both the azimuthal angle system and elevation angle system must be arranged to a redundant structure. Since a usual structure needs four hybrid circuits, eight hybrid circuits which are twice those of the usual structure are needed to provide the redundant structure, and thus the conventional monopulse tracking apparatus is disadvantageous in that the structure thereof is very complex.

SUMMARY OF THE INVENTION

An object of the present invention made to solve the above problem of the conventional four-horn monopulse tracking apparatus is to provide a monopulse tracking apparatus having a simplified redundant structure.

To achieve the above object, according to the present invention, a monopulse tracking apparatus comprises first to fourth electromagnetic horns disposed symmetrically to each other in an azimuthal angle direction and elevation angle direction in a 2×2 matrix state; a means for creating an elevation angle error signal composed of the difference signal of the sum signal of the first and second electromagnetic horns disposed in the azimuthal angle direction and the sum signal of the third and fourth electromagnetic horns disposed in the azimuthal angle direction in the same way; a means for creating an azimuthal angle error signal composed of the difference signal of the sum signal of the first and third electromagnetic horns disposed in the elevation angle direction and the sum signal of the second and fourth electromagnetic horns disposed in the elevation angle direction in the same way; a means for creating an error signal in a 135° direction composed of the difference signal of the first and fourth electromagnetic horns disposed in the counterclockwise direction of 135° with respect to the azimuthal angle direction; and/or a means for creating an error signal in a 45° direction composed of the difference signal of the second and third electromagnetic horns disposed in the counterclockwise direction of 45° with respect to the azimuthal angle direction.

The monopulse tracking apparatus arranged as described above can obtain three or four kinds of error signals by a simple structure that one or two error signal creation means are added to the conventional monopulse tracking apparatus. Therefore, even if information of one system of three or four kinds of error signal systems cannot be obtained, or information of two systems cannot be obtained when four kinds of error signals are created, by the failure of the apparatus, or the like, the position of a radio wave emitting object can be determined by making use of the information of the remaining two systems, and thus a redundant structure can be simplified as compared with a conventional one.

BRIEF DESCRIPTION OF THE DRAWINGS

FIG. 3 is a diagram schematically showing a second embodiment.

DESCRIPTION OF PREFERRED EMBODIMENTS

Figure 1:
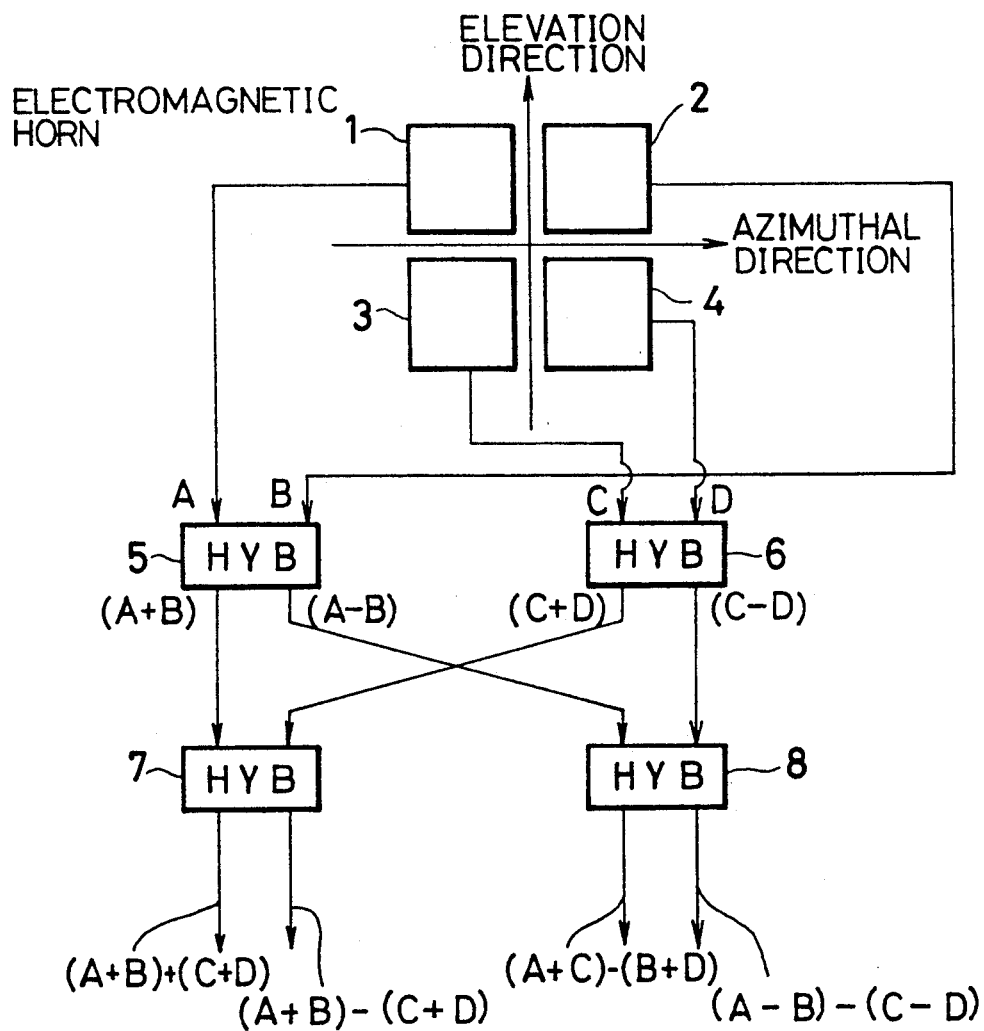
FIG. 1 is a diagram schematically showing an example of the structure of a conventional monopulse tracking apparatus.
Figure 2:
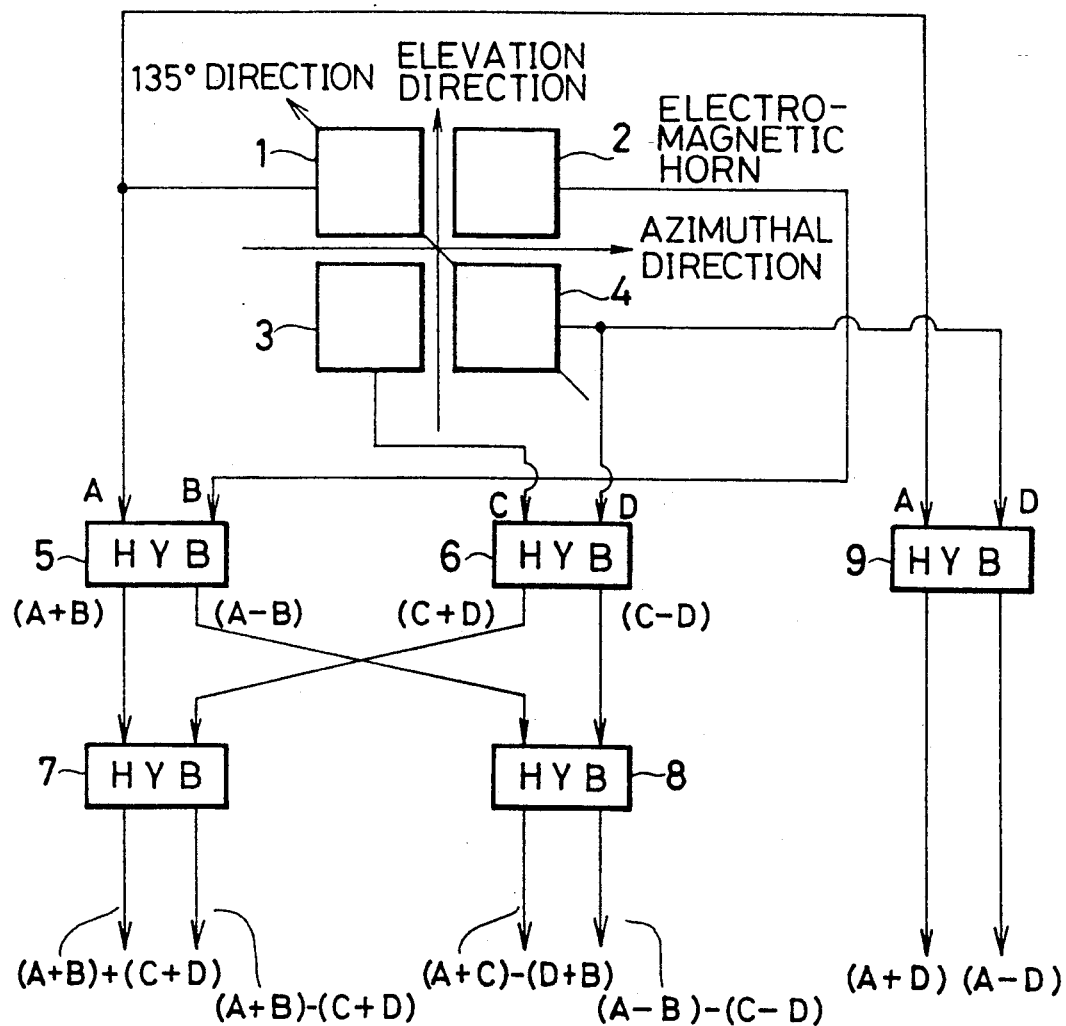
FIG. 2 is a diagram schematically showing a first embodiment of a monopulse tracking apparatus according to the present invention.

Next, the preferred embodiments will be described. FIG. 2 is a diagram schematically showing a first embodiment of a monopulse tracking apparatus according to the present invention, wherein the same numerals as used in the conventional apparatus shown in FIG. 1 are used to designate the same or corresponding parts and the description thereof is omitted. This embodiment is further provided with a hybrid circuit 9 which is supplied with the signals A and D received by the fist and fourth electromagnetic horns and creates a sum signal (A+D) thereof and a difference signal (A−D) thereof, in addition to the structure of the conventional four-horn monopulse tracking apparatus shown in FIG. 1.

In the monopulse tracking apparatus arranged as described above, when a radio wave arrives, the respective electromagnetic horns 1, 2, 3 and 4 output receiving signals corresponding to the arrived radio wave. Then, the hybrid circuit 7 outputs a sum signal [(A+B)+(C+D)] of the sum signal (A+B) of the electromagnetic horns 1 and 2 and the sum signal (C+D) of the electromagnetic horn 3 and 4 and a difference signal [(A+B)−(C+D)] of these sum signals (A+B) and (C+D); and the hybrid circuit 8 outputs a sum signal [(A−B)+(C−D)=(A+C)−(B+D)] of the difference signal (A−B) of the electromagnetic horns 1 and 2 and the difference signal (C−D) of the electromagnetic horns 3 and 4 and also outputs a difference signal [(A−B)−(C−D)] of the difference signal (A−B) of the electromagnetic horns 1 and 2 and the difference signal (C−D) of the electromagnetic horns 3 and 4, in the same way as the conventional example shown in FIG. 1. Further, the hybrid circuit 9 outputs a sum signal (A+D) of the electromagnetic horns 1 and 4 and the difference signal (A−D) thereof.

The three signals of the respective output signals obtained from the respective hybrid circuits 7, 8 and 9, i.e., the difference signal [(A+B)−(C+D)] from the hybrid circuit 7, the sum signal [(A+C)−(B+D)] from the hybrid circuit 8, and the difference signal (A−D) from the hybrid circuit 9 are used to determine the position of a radio wave emitting object. These signals are an elevation angle error signal, azimuthal angle error signal and error signal in the counterclockwise direction of 135° from the azimuthal angle, respectively. Therefore, the three kinds of the signals can be used to determine the two-dimensional position of the radio wave emitting object, and thus even if one kind of the signals cannot be obtained by the failure of the apparatus, or the like, the position can be determined by the remaining two kinds of signal information.

Note, although the above embodiment uses as a third error signal the difference signal (A−D) obtained from the hybrid circuit supplied with the signals A and D received by the first and fourth electromagnetic horns 1 and 4, a hybrid circuit supplied with the signals B and C received by the second and third electromagnetic horns 2 and 3 may be provided to use the difference signal (B−C) obtained therefrom in place of the difference signal (A−D). The third error signal of this case is an error signal in the counterclockwise direction of 45° from an azimuthal angle.

Next, a second embodiment will be described with reference to FIG. 3. This embodiment is further provided with a hybrid circuit 10 which is supplied with the signals B and C received by the second and third electromagnetic horns 2 and 3 and creates a sum signal (B+C) thereof and a difference signal (B−C) thereof. in addition to the structure of the embodiment shown in FIG. 2.

In this embodiment, although two output signals are obtained from the hybrid circuit 10 in addition to the six outputs obtained from the first embodiment, the four signals of the them, i.e., the difference signal [(A+B)−(C+D)] from the hybrid circuit 7, the sum signal [(A−B) (C−D)=(A+C)−(B+D)] from the hybrid circuit 8, the difference signal (A−D) from the hybrid circuit 9, and the difference signal (B−C) from the hybrid circuit 10 are used to determine the position of the radio wave emitting object. These signals are an elevation angle error signal, azimuthal angle error signal, error signal in the counterclockwise direction of 135° from the azimuthal angle, and error signal in the counterclockwise direction of 45° therefrom, respectively. Therefore, since these four kinds of the signals can be used to determine the a two-dimensional position, even if two kinds of the signals of them cannot be obtained, the position of the radio wave emitting object can be determined by the remaining two kinds of signal information.

As described above based on the embodiments, according to the present invention, since three or four kinds of error signals can be obtained with a simple structure, even if one or two kinds of the signals cannot be obtained, the two-dimensional position of an radio wave emitting object can be determined. Consequently, a redundant structure can be simplified.

What is claimed is:

1. A monopulse tracking apparatus, comprising:
   first to fourth electromagnetic horns disposed symmetrically to each other in an azimuthal angle direction and elevation angle direction in a 2×2 matrix state;
   a means for creating an elevation angle error signal composed of the difference signal of the sum signal of the first and second electromagnetic horns disposed in the azimuthal angle direction and the sum signal of the third and fourth electromagnetic horns disposed in the azimuthal angle direction in the same way;
   a means for creating an azimuthal angle error signal composed of the difference signal of the sum signal of the first and third electromagnetic horns disposed in the elevation angle direction and the sum signal of the second and fourth electromagnetic horns disposed in the elevation angle direction in the same way; and
   a means for creating an error signal in a 135° direction composed of the difference signal of the first and fourth electromagnetic horns disposed in the counterclockwise direction of 135° with respect to the azimuthal angle direction.

2. A monopulse tracking apparatus, comprising:
   first to fourth electromagnetic horns disposed symmetrically to each other in an azimuthal angle direction and elevation angle direction in a 2×2 matrix state;
   a means for creating an elevation angle error signal composed of the difference signal of the sum signal of the first and second electromagnetic horns disposed in the azimuthal angle direction and the sum signal of the third and fourth electromagnetic horns disposed in the azimuthal angle direction in the same way;

a means for creating an azimuthal angle error signal composed of the difference signal of the sum signal of the first and third electromagnetic horns disposed in the elevation angle direction and the sum signal of the second and fourth electromagnetic horns disposed in the elevation angle direction in the same way; and a means for creating an error signal in a 45° direction composed of the difference signal of the second and third electromagnetic horns disposed in the counterclockwise direction of 45° with respect to the azimuthal angle direction.

3. A monopulse tracking apparatus, comprising:

first to fourth electromagnetic horns disposed symmetrically to each other in an azimuthal angle direction and elevation angle direction in a 2×2 matrix state;

a means for creating an elevation angle error signal composed of the difference signal of the sum signal of the first and second electromagnetic horns disposed in the azimuthal angle direction and the sum signal of the third and fourth electromagnetic horns disposed in the azimuthal angle direction in the same way;

a means for creating an azimuthal angle error signal composed of the difference signal of the sum signal of the first and third electromagnetic horns disposed in the elevation angle direction and the sum signal of the second and fourth electromagnetic horns disposed in the elevation angle direction in the same way;

a means for creating an error signal in a 135° direction composed of the difference signal of the first and fourth electromagnetic horns disposed in the counterclockwise direction of 135° with respect to the azimuthal angle direction; and a means for creating an error signal in a 45° direction composed of the difference signal of the second and third electromagnetic horns disposed in the counterclockwise direction of 45° with respect to the azimuthal angle direction.

* * * * *